(12) United States Patent
Yoshida et al.

(10) Patent No.: US 6,978,064 B2
(45) Date of Patent: Dec. 20, 2005

(54) VARIABLE OPTICAL FILTER AND OPTICAL TRANSMISSION SYSTEM USING SAME, AND METHOD OF CONTROLLING VARIABLE OPTICAL FILTER

(75) Inventors: Setsuo Yoshida, Yokohama (JP); Hiroshi Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/705,220

(22) Filed: Nov. 12, 2003

(65) Prior Publication Data
US 2004/0135172 A1 Jul. 15, 2004

(30) Foreign Application Priority Data
Nov. 13, 2002 (JP) .............................. 2002-329367

(51) Int. Cl.⁷ .............................................. G02B 6/26
(52) U.S. Cl. ........................................ 385/27; 385/15
(58) Field of Search ............................ 385/1–3, 27, 39, 385/40, 129

(56) References Cited

U.S. PATENT DOCUMENTS 5,912,750 A * 6/1999 Takeda et al. ................. 398/92
6,266,168 B1 * 7/2001 Denkin et al. .................. 398/5
2003/0035619 A1 * 2/2003 Pfeiffer ........................ 385/27

FOREIGN PATENT DOCUMENTS

| JP | 06-276154 | * | 9/1994 | .......... H04B 10/04 |
| JP | 09-244079 | | 9/1997 | |
| JP | 09-289349 | | 11/1997 | |
| JP | 2000-199880 | | 7/2000 | |

* cited by examiner

Primary Examiner—Frank G. Font
Assistant Examiner—Christopher M. Kalivoda
(74) Attorney, Agent, or Firm—Staas & Halsey LLP (57) ABSTRACT

The present invention has an object of providing a variable optical filter that can move its periodic filter characteristic over a wide range in parallel to an optical frequency axis direction. To this end, the variable optical filter of the present invention comprises: first and second filter sections connected in series via an optical path, and a control section for controlling the periodic filter characteristic of each of the first and second filter sections. The control section, when the filter characteristic of one of the first and second filter sections is required to move in parallel to the optical frequency axis direction to exceed a variable range, relatively controls the filter characteristic of each of the first and second filter sections such that the switching is performed from one filter section to the other filter section, provided that the filter characteristic of the overall variable optical filters becomes constant.

12 Claims, 9 Drawing Sheets

VARIABLE OPTICAL FILTER AND OPTICAL TRANSMISSION SYSTEM USING SAME, AND METHOD OF CONTROLLING VARIABLE OPTICAL FILTER

BACKGROUND OF THE INVENTION

1. Field of the Invention

The present invention relates to a technique for controlling a variable optical filter whose transmissivity is changed periodically along an optical frequency axis, and in particular, relates to a variable optical filter suitable for compensating for a tilt due to wavelength (or optical frequency) dependence of an optical transmission path, an optical amplifier and the like, an optical transmission system using the same, and a method of controlling the variable optical filter, following the variation of the tilt.

2. Description of the Related Art

Heretofore, it has been known that, in a wavelength division multiplexing optical transmission system for transmitting a wavelength division multiplexed (WDM) signal light through an optical amplifying and repeating transmission path which is configured by connecting an optical fiber transmission path and optical amplifying repeaters, deviation of signal light level due to wavelength (or optical frequency) dependence of a gain of the optical amplifying repeater and the like is compensated for using an optical filter (referred to hereunder as a variable optical filter) with a variable transmission characteristic.

As the variable optical filter utilized for compensation as described above, there have been known a variable optical filter using a single periodic filter whose transmissivity is changed periodically along an optical frequency axis, one in which a plurality of periodic filters with mutually different periods is connected in series to construct a filter characteristic of desired shape along the optical frequency axis based on the theory of Fourier series expansion, and the like (refer to Japanese Unexamined Patent Publication No. 6-276154, Japanese Unexamined Patent Publication No. 9-244079, Japanese Unexamined Patent Publication No. 9-289349, Japanese Unexamined Patent Publication No. 2000-199880). In the variable optical filter with such a periodic filter characteristic, the variable filter characteristic thereof is controlled according to the variation of required filter characteristic, thereby enabling to compensate for the deviation of signal light level over a wide range.

Incidentally, for a conventional variable optical filter with the periodic filter characteristic as described above, in the case where the required filter characteristic continues to be varied slightly in an optical frequency axis direction, if a range of the variation is within a variable range of filter characteristic, it is possible to follow the required filter characteristic by changing the filter characteristic minutely at each variation of the required filter characteristic. However, if the range of the variation is outside the variable range of filter characteristic, even if an amount of the variation at that point is minute, it is not possible to continuously change the filter characteristic in response to the requirement.

In order to comply with the requirement in such a situation, for example, it is necessary to control the periodic filter characteristic to be back by at least one period in an opposite direction from a required changing direction. In this case, even if the change of the filter characteristic in the vicinity of the control is minute, since sometimes the filter characteristic must be varied significantly during the control, there is caused a problem in that the light intensity may be varied significantly over the whole optical frequency band, being a compensation object.

Figure 9:
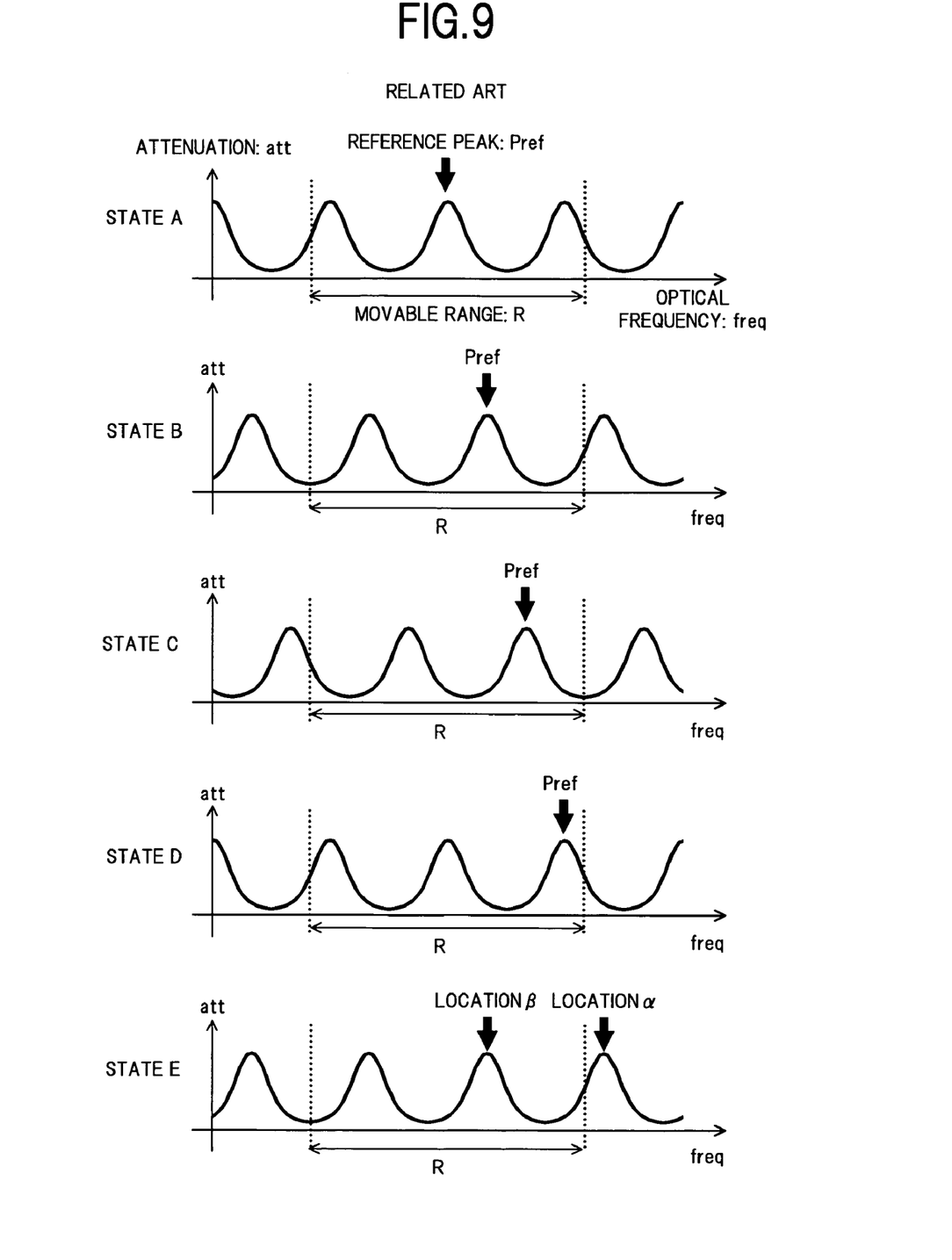
FIG. 9 is a diagram showing a state in which a periodic filter characteristic is moved in parallel to an optical frequency axis direction in a conventional variable optical filter.
Figure 10:
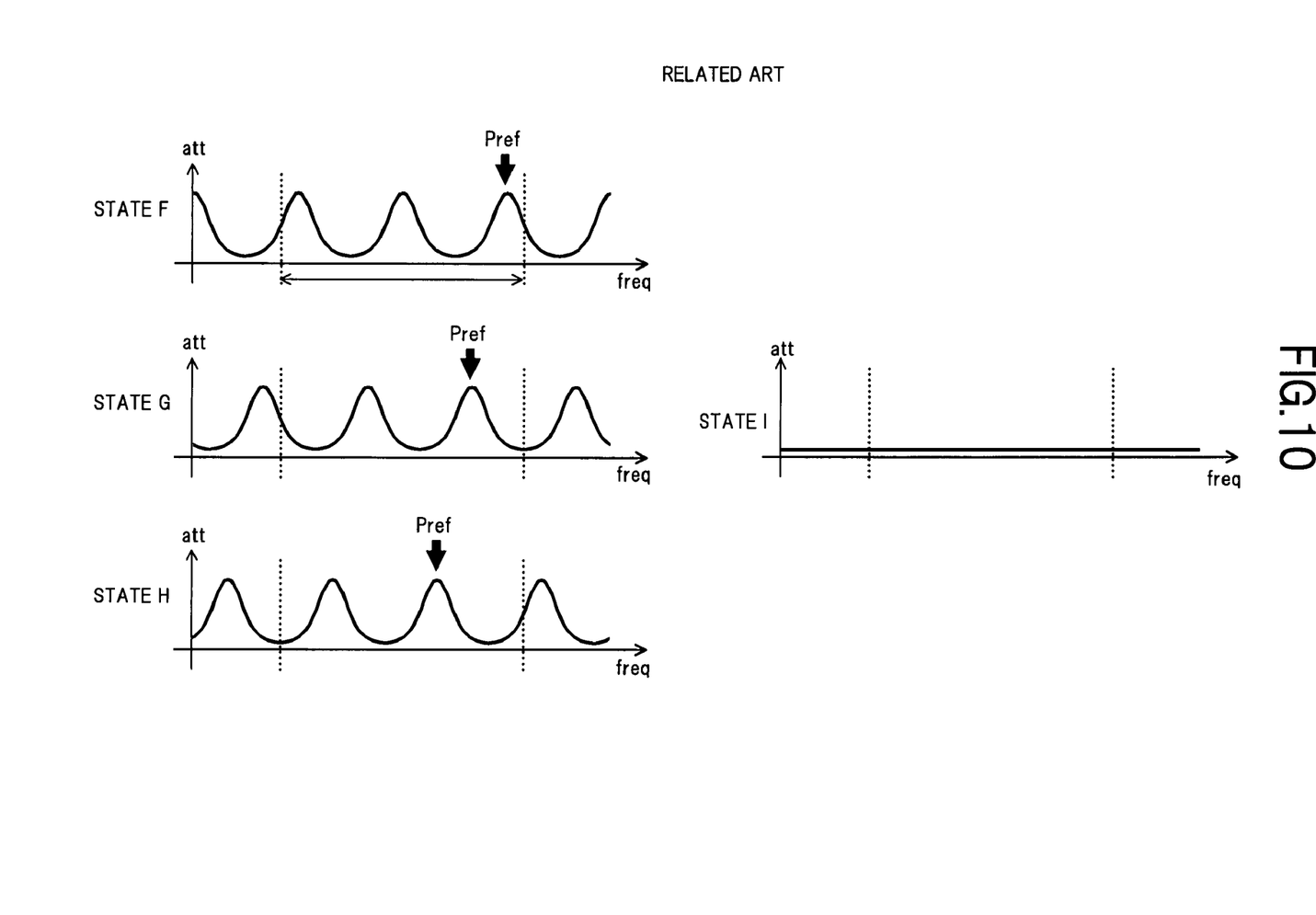
FIG. 10 is a diagram for explaining problems of the conventional variable optical filter.

Here is a specific description of the above problem using FIG. 9 and FIG. 10. In the following description of the periodic filter characteristic of a variable optical filter, focusing attention on one attenuation peak where the attenuation is maximum, as a reference peak Pref. Then, the variable range of filter characteristic in the optical frequency axis direction is designated a variable range R of the above described reference peak Pref.

The consideration is made on, for example, the case where, when a state A shown at the top of FIG. 9 is an initial state of the variable optical filter, the filter characteristic is required to move continuously by each minute amount in parallel to the frequency axis direction toward a high frequency side. In this case, the variable filter characteristic can follow from the state A through a state B and a state C up to a state D. However, when the variable filter characteristic is required to be changed to a state E as shown at the bottom of FIG. 9, even if a difference between the filter characteristic in the state D and the filter characteristic in the state E is minute, since the change of the filter characteristic exceeds the variable range R, it is not possible for the reference peak Pref in the state D to continue to move to a location α. Therefore, in order to change the filter characteristic from the state D to the state E, it is necessary to move the reference peak Pref to a location β.

For an operation of when the filter characteristic is changed from the state D to the state E by moving the reference peak Pref to the location β, it is possible to consider the case where the filter characteristic is changed from a state F to a state H via a state G, or the case where the filter characteristic is changed from the state F to the state H via a state I, as a more specific example.

In the case where the filter characteristic is changed via the state G, since the reference peak Pref crosses a region where the reference peak Pref is not primarily required to have a peak characteristic, the large unnecessary variation occurs in the filter characteristic during the change.

On the other hand, in the case where the filter characteristic is set to be a flat transmission state with respect to the optical frequency as shown in the state I, the reference peak Pref is moved to a location of the reference peak Pref in the state H while maintaining the state I, and thereafter, the attenuation of the variable optical filter is increased, the peak characteristic primarily required disappears momentarily over the whole optical frequency band being the compensation object, while the filter characteristic is maintained in the state I. Therefore, the large unnecessary variation occurs in the filter characteristic.

SUMMARY OF THE INVENTION

The present invention has been accomplished in view of the above-described problems, with an object of providing a variable optical filter whose periodic filter characteristic can be moved over a wide range in parallel to an optical frequency axis direction, an optical transmission system using the same, and a method of controlling the variable optical filter.

In order to achieve the above-described object, a variable optical filter according to the present invention comprises: first and second filter sections connected in series to each other, each having a filter characteristic whose transmissivity is changed periodically along an optical frequency axis, the filter characteristic has variable transmissivity and can be moved in parallel to an optical frequency axis direction, and also the same filter characteristic can be set within a common variable range in the optical frequency axis direction; and a control section for, when the filter characteristic of one of the first and second filter sections is required to move in parallel to the optical frequency axis direction to exceed the variable range, relatively controlling the filter characteristics of the first and second filter sections such that the switching is performed from one filter section to the other filter section, provided that the overall filter characteristic of when the first and second filter sections are combined becomes constant.

In the variable optical filter with such a construction, in the case where the variable filter characteristic is moved in parallel to the optical frequency axis direction, when one of the first and second filter sections is required to be changed to exceed the variable range, then provided that the overall filter characteristic of when the filter sections are combined is set to be constant, the switching is performed from one filter section to the other filter section. Thus, it becomes possible to move continuously the filter characteristic of the overall variable optical filter in parallel to the optical frequency axis direction without substantially changing the intensity of light having passed through each of the filter sections.

In one specific aspect of the above-described control section, the construction may be such that, when the first filter section is in a state in which the filter characteristic thereof is flat with respect to optical frequency so that the maximum transmissivity can be obtained, and the overall filter characteristic is determined by the filter characteristic of the second filter section, then before the parallel movement of the filter characteristic of the second filter section in the optical frequency axis direction reaches a boundary of the variable range, the switching is performed from the second filter section to the first filter section by reducing continuously the amplitude of the transmissivity of the first filter section while increasing continuously the amplitude of the transmissivity of the second filter section, provided that the overall filter characteristic of when the first and second filter sections are combined becomes constant. In such a control section, the switching from the second filter section to the first filter section is performed while maintaining the overall filter characteristic constant by relatively increasing and decreasing the amplitudes of the transmissivity of each of the first and second filter sections.

Furthermore, the above-described variable optical filter may be provided with an optical amplification section for compensating for losses occurring in the first and second filter sections. With such a construction, it becomes possible to decrease the insertion loss of the variable optical filter.

An optical transmission system according to the present invention is for collectively amplifying a wavelength division multiplexed signal light using an optical amplifier arranged on an optical transmission path, and also compensating for a tilt occurring in the wavelength division multiplexed signal light using at least one gain equalizer to repeatedly transmit the wavelength division multiplexed signal light, wherein the gain equalizer includes the variable optical filter of the present invention as described above. In the optical transmission system with such a construction, the tilt occurring in the wavelength division multiplexed signal light due to wavelength (or optical frequency) dependence of the optical transmission path, the optical amplifier and the like is compensated for by the gain equalizer using the variable optical filter of the present invention. At this time, even if the tilt occurring in the signal light is varied, since the characteristic of the variable optical filter can be controlled over a wide wavelength range, following the variation of the tilt, such a situation in which the light intensity of the signal light repeatedly transmitted is varied significantly due to the control of the variable optical filter is avoided.

Other objects, features and advantages of this invention will become apparent from the following description of embodiments given in conjunction with the appended drawings.

DETAILED DESCRIPTION OF THE INVENTION

Hereunder is a description of embodiments of the present invention based on the drawings.

Figure 1:
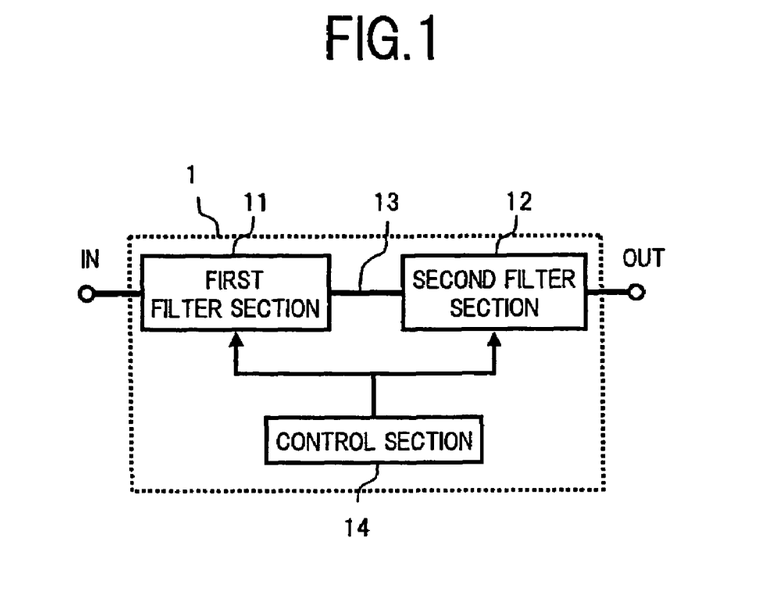
FIG. 1 is a block diagram showing the structure of a variable optical filter according to an embodiment of the present invention.

FIG. 1 is a block diagram showing the structure of a variable optical filter according to an embodiment of the present invention.

In FIG. 1, the present variable optical filter 1 comprises, for example, a first filter section 11, a second filter section 12, an optical path 13, and a control section 14. The first filter section 11 and the second filter section 12 are connected in series between an input terminal IN and an output terminal OUT via the optical path 13, and a filter characteristic of each of the filter sections 11 and 12 is controlled by the control section 14.

The first filter section 11 and the second filter section 12 each has the filter characteristic whose transmissivity is changed periodically along an optical frequency axis. The periodic filter characteristic of each of the first and second filter sections 11 and 12 has variable transmissivity (amplitude), can be moved in parallel within a required range (variable range) in an optical frequency axis direction, and can be set to the same characteristic within a common variable range.

For a specific structure of the first and second filter sections, it is possible to apply, for example, a structure utilizing a single periodic filter, a structure in which a plurality of periodic filters with mutually different periods is connected in series to realize a filter characteristic of desired shape, or the like. Specific examples of the periodic filter with variable filter characteristic are the Mach-Zehnder interferometer type filter described in the above, an etalon type filter in which a reflective film is formed on incident and emission planes of a magneto-optical crystal (Japanese Patent Application 2002-146643) and the like.

Figure 2:
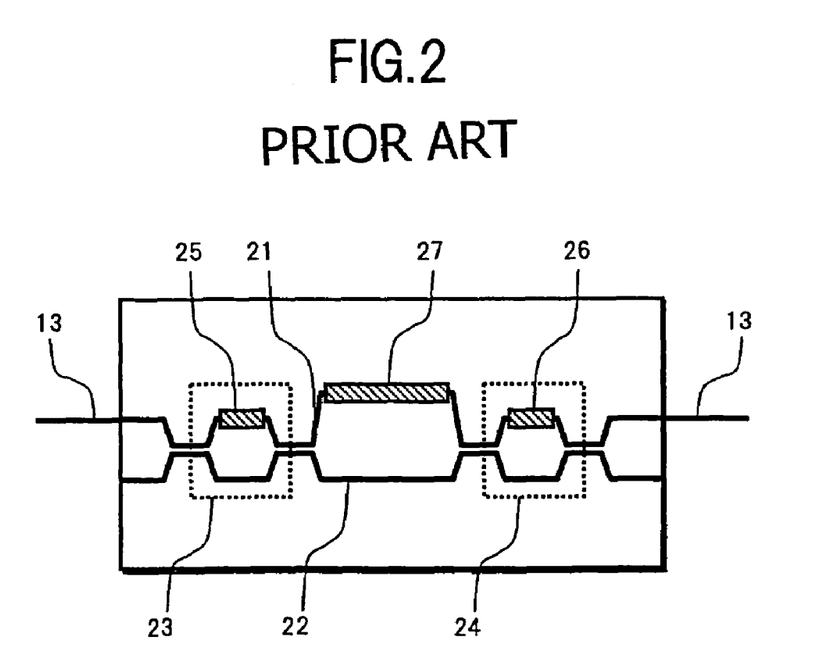
FIG. 2 is a plan view showing the basic structure of a Mach-Zehnder interferometer type filter, which can be used as first and second filter sections in the embodiment.

The abovementioned Mach-Zehnder interferometer type filter has a basic structure as shown in FIG. 2, for example. That is, the Mach-Zehnder interferometer type filter in FIG. 2 has a structure in which input sides and output sides of two optical waveguides 21 and 22 of different lengths are connected by directional couplers 23 and 24, respectively, and it is possible to change the coupling efficiency by adjusting bias currents to electrodes 25 and 26 installed in the directional couplers 23 and 24 to change the amplitude of the filter. Furthermore, it is possible to change a phase of the filter by adjusting a bias current to an electrode 27 installed on the optical waveguide 21 between the directional couplers 23 and 24.

The abovementioned etalon type filter is constructed by forming the reflective film on incident and emission planes of a variable polarization controller which utilizes the magneto-optical effect, such as a Faraday rotator or the like, and transmissivity (or loss) thereof can be changed by controlling its Faraday rotation angle. Furthermore, it is also possible to control a transmission characteristic along the optical frequency axis, by forming the Faraday rotator of a pair of wedge-shaped movable magneto-optical crystals and controlling the length of etalon resonator.

The optical path 13 (FIG. 1) connects between the input terminal IN of the present variable optical filter 1 and an input terminal of the first filter section 11, between an output terminal of the first filter section 11 and an input terminal of the second filter section 12, and between an output terminal of the second filter section 12 and the output terminal OUT of the variable optical filter 1, using an optical fiber, optical waveguides and the like, for example.

Figure 3:
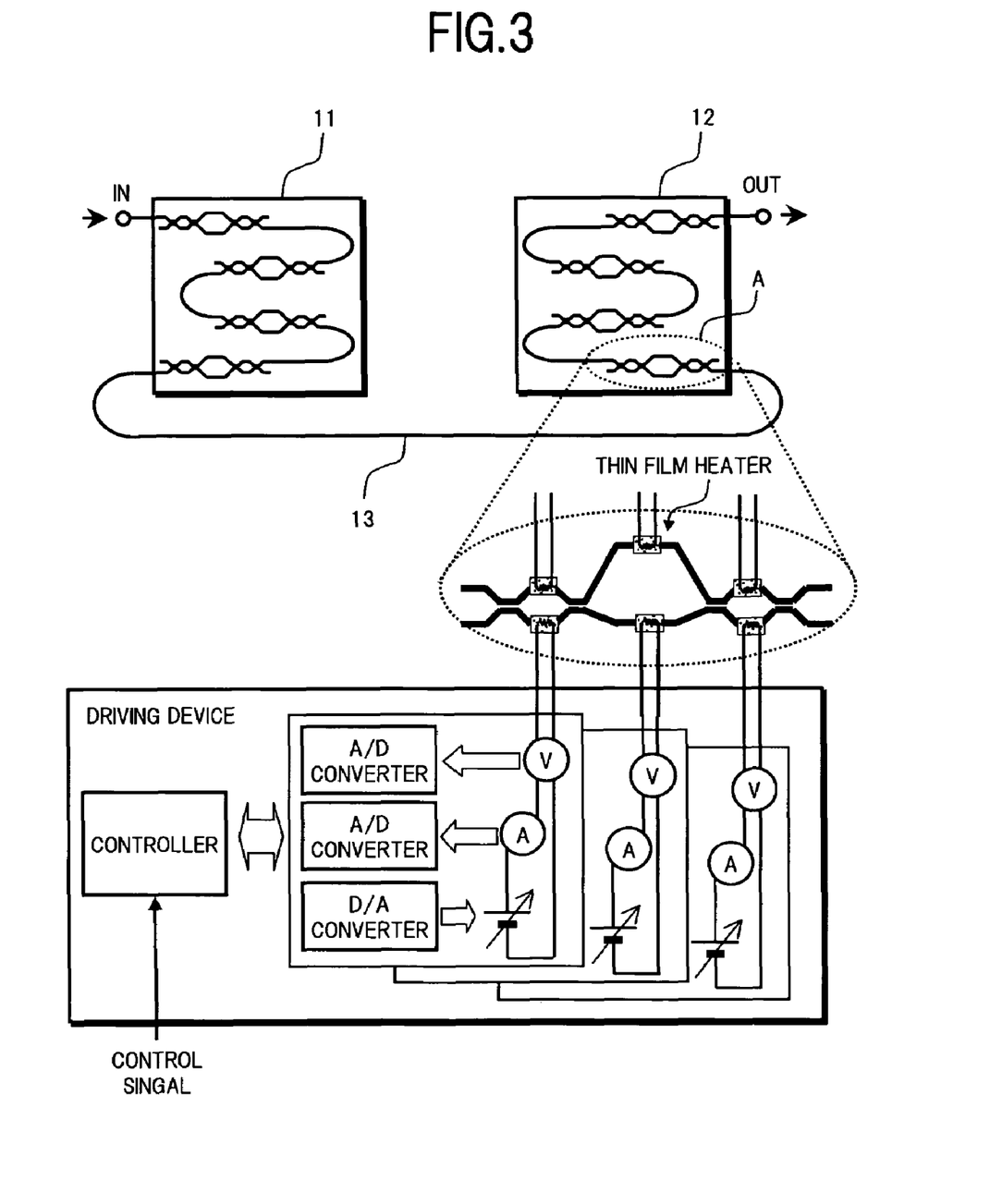
FIG. 3 is a diagram showing an example of a specific structure of the first and second filter sections and an optical path in the embodiment.

FIG. 3 is a plan view showing an example of a specific structure of the first and second filter sections 11 and 12 and the optical path 13.

In the structural example of FIG. 3, an optical filter which is made by connecting in series four Mach-Zehnder interferometer type filters each having the basic structure as shown in FIG. 2 to one chip, is used as each of the first and second filter sections 11 and 12. Here, the optical fiber 13 connects between an output terminal of the fourth stage Mach-Zehnder interferometer type filter in the first filter section 11 and an input terminal of the first stage Mach-Zehnder interferometer type filter in the second filter section 12. Furthermore, the input terminal IN is connected to an input terminal of the first stage Mach-Zehnder interferometer type filter in the first filter section 11, and the output terminal OUT is connected to an output terminal of the fourth stage Mach-Zehnder interferometer type filter in the second filter section 12.

The Mach-Zehnder interferometer type filter in each stage constituting each of the first and second filter sections 11 and 12 is here, for example, driven by being applied with bias currents which are generated by a driving device such as shown at the bottom of the figure, to the directional couplers on the input side and output side thereof, and electrodes, such as thin film heaters or the like, provided on the two optical waveguides located between the directional couplers, as shown in the enlarged diagram of A, enclosed by dotted lines in the figure. This driving device receives a control signal output from the control section 14 described later by a controller, and sends a signal output from the controller in accordance with the control signal to a variable power supply via a D/A converter, for example, to adjust the bias current given to each electrode. In addition, an ammeter and a voltmeter provided corresponding to each electrode are for monitoring an actual driving state of each electrode, and a signal indicating each monitoring result is fed back to the controller via an A/D converter.

Here, the structural example is shown in which the first and second filter sections 11 and 12 are formed individually, and the optical path 13 connects between them. However, it is also possible to integrate the first and second filter sections 11 and 12 to form a single device. Furthermore, a specific filter characteristic of each of the first and second filter sections, obtained by combining a plurality of periodic filters (four staged Mach-Zehnder interferometer type filters in the above-described example) with mutually different periods, will be described later.

The control unit 14 controls the variable filter characteristic of each of the first and second filter sections 11 and 12 such that, even when the filter characteristic is required to move in parallel to the optical frequency axis direction to exceed the variable range, the intensity of light output from the output terminal OUT is not varied while changing the filter characteristic.

Figure 4:
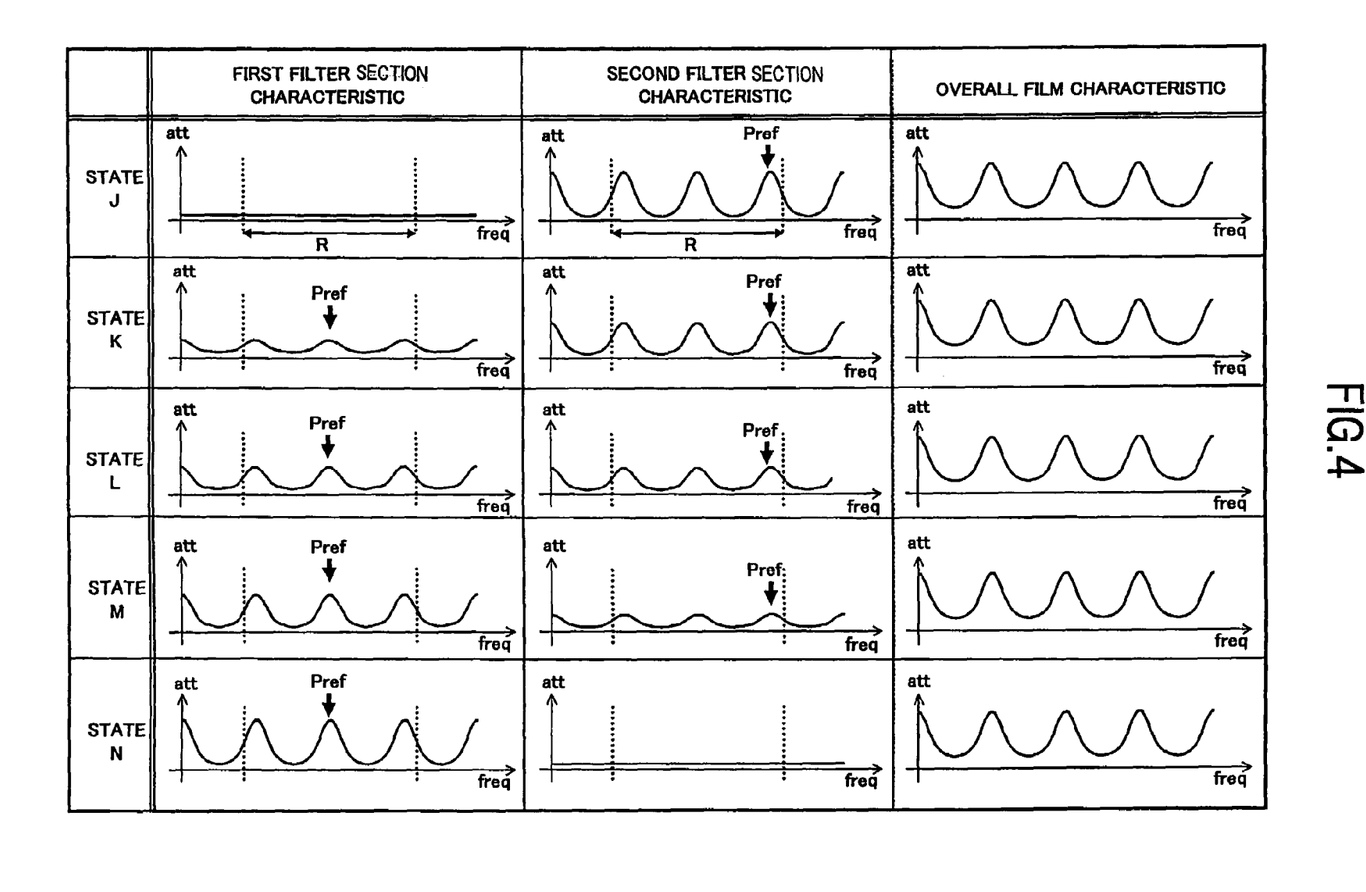
FIG. 4 is a diagram for explaining an operation of a control section of the embodiment.

Here is a detailed description of a specific procedure for controlling the filter characteristic of each of the first and second filter sections 11 and 12 by the control section 14, with reference to FIG. 4. However, in order to simplify the description, a single periodic filter is used here for each of the first and second filter sections 11 and 12.

Firstly, in an initial state of the present variable optical filter 1, as shown in a state J of FIG. 4, for example, the control section 14 controls the filter characteristic of each of the first and second filter sections 11 and 12 such that a required filter characteristic is realized by using only the second filter section 12. To be specific, the amplitude and phase of the periodic filter characteristic of the second filter section 12 are controlled corresponding to the required filter characteristic, and the first filter section 11 is controlled so as to realize a state (referred to hereunder as a transmission state) in which the filter characteristic thereof is flat with respect to optical frequency, and minimum attenuation (or maximum transmissivity) is obtained. As a result, the overall filter characteristic of the variable optical filter 1, in which the filter characteristics of the optical filter sections 11 and 12 are combined, corresponds to the periodic filter characteristic of the second filter section 12.

In the initial state as described above, focusing attention on one attenuation peak where the attenuation of the second filter section 12 becomes maximum, as a reference peak Pref, a range over which this reference peak Pref can be moved in parallel to the optical frequency axis is set to be a variable range R. In the case where the reference peak Pref is located near a boundary of a low frequency side or a high frequency side of the variable range R, it is considered that the parallel movement of the filter characteristic of the second filter section 12 toward the low frequency side or the high frequency side is approaching a limit, and a switching control is performed from the second filter section 12 to the first filter section 11.

To be specific, the above-described switching control is performed by continuously increasing the amplitude of the attenuation (or continuously decreasing the amplitude of the transmissivity) of the first filter section 11, and also by continuously decreasing the amplitude of the attenuation (or continuously increasing the amplitude of the transmissivity) of the second filter section 12, provided that the overall filter characteristic of the variable optical filter 1 is always constant. At this time, it is desirable to control the phase of the periodic filter characteristic of the first filter section 11 such that the location of the reference peak Pref on the optical frequency axis is near the center of the variable range R.

States K to N in FIG. 4 show, in stepwise, an example of the characteristic of each of the first and second filter sections 11 and 12, and the overall characteristic of the variable optical filter when the above-described series of switching control is performed. In this manner, the characteristic reaches the state N by way of the state K, state L and state M so that the switching from the second filter section 12 to the first filter section 11 is performed while maintaining the overall filter characteristic of the variable optical filter 1 constant at each of the stages of the states K to N. After the characteristic reaches the state N, the required filter characteristic is realized by using only the first filter section 11, and the second filter section 12 is in the transmission state.

Furthermore, although not shown in the figure, when the periodic filter characteristic of the first filter section 11 is moved in parallel to the optical frequency axis, and the reference peak Pref is located near the boundary of the variable range R, the switching from the first filter section 11 to the second filter section 12 is performed according to a procedure reverse to the switching control from the second filter section 12 to the first filter section 11 as described above. To be specific, after controlling the phase such that when the second filter section 12 is in the transmission state, the reference peak Pref of the second filter section 12 is near the center of the variable range R, provided that the overall filter characteristic of the variable optical filter 1 is always constant, the control section 14 continuously decreases the amplitude of the attenuation of the first filter section 11, and also continuously increases the amplitude of the attenuation of the second filter section 12.

As described above, when the reference peak Pref of one of the filter sections that is responsible for realizing the required filter characteristic is located near the boundary of the variable range R, by repeating the control for switching the role to the other filter section, it becomes possible to move continuously the overall filter characteristic of the variable optical filter 1 in parallel to the optical frequency axis direction.

Next is a description of the filter characteristic of each of the first and second filter sections 11 and 12, obtained by combining a plurality of periodic filters.

In general, as apparent from Fourier series expansion, it is known that an optical filter with a desired optical frequency characteristic can be realized by connecting a plurality of periodic filters with mutually different free spectral ranges (FSR) in series based on a theory that a filter characteristic of arbitrary shape can be realized by superimposing a plurality of sine waves of mutually different periods.

Figure 5:
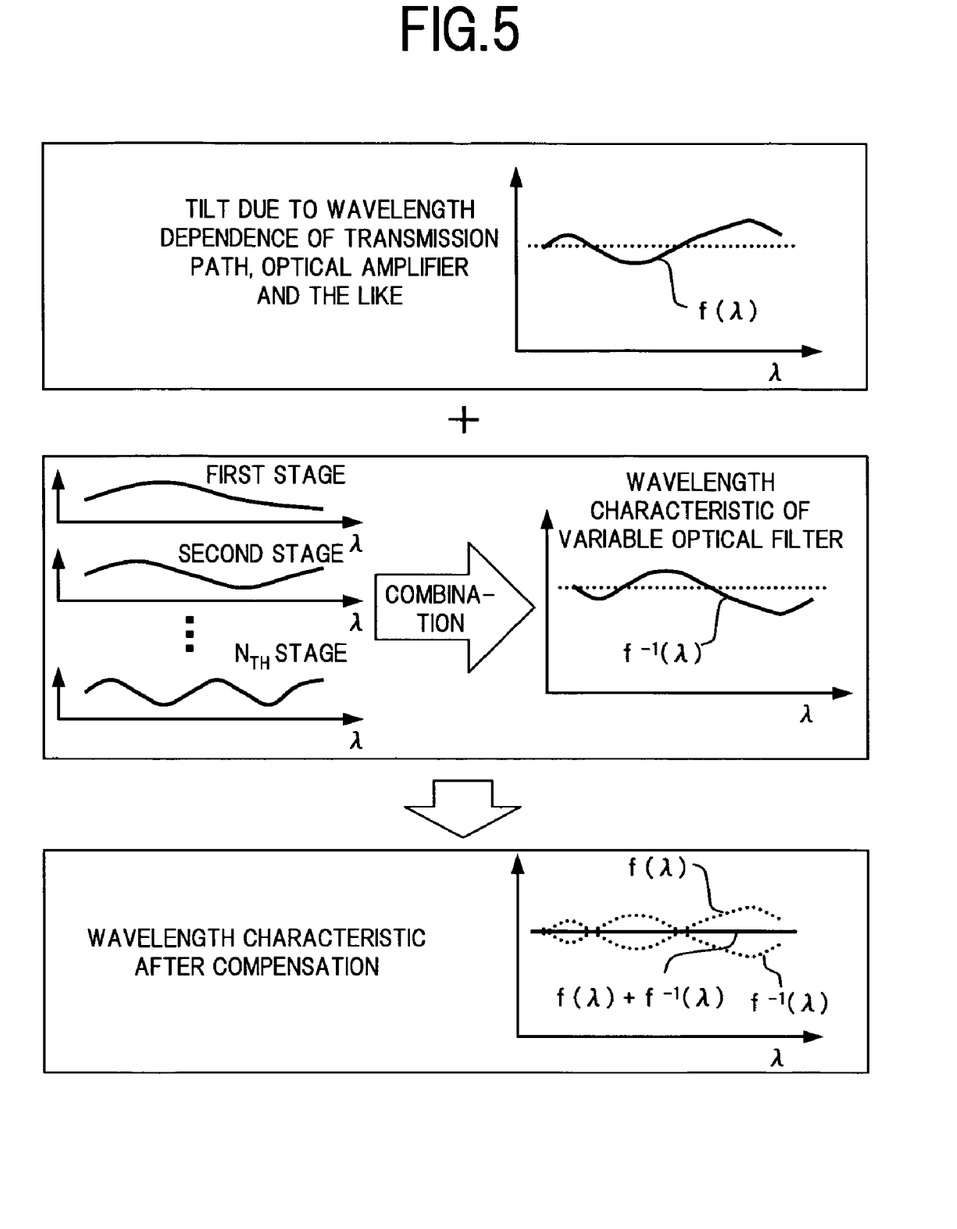
FIG. 5 is a diagram for explaining filter characteristics of when the first and second filter sections are constituted by combining a plurality of periodic filters.

To be specific, the consideration is made on the realization of an optical filter for compensating for tilt $f(\lambda)$ due to wavelength (or optical frequency) dependence of a transmission path, an optical amplifier and the like, as shown at the top of FIG. 5 for example, by a combination of N stages periodic filters. In this case, for the basic period determined according to the wavelength band of tilt $f(\lambda)$ being a compensation object, the FSR of combined N stages periodic filters is set to satisfy a condition of 1/n times (where n is an integer), and also the amplitude of each of the periodic filters is set according to the result of Fourier series expansion of the tilt $f(\lambda)$. By combining N stages periodic filters whose FSR and amplitudes are set in this manner, an optical filter with a characteristic $f^{-1}(\lambda)$ inverse to tilt $f(\lambda)$ as shown in the middle of FIG. 5 is constructed. A flat wavelength characteristic as shown at the bottom of FIG. 5 is realized by compensating for the tilt $f(\lambda)$ using this optical filter.

Accordingly, in the case where each of the first and second filter sections 11 and 12 is constructed by combining the plurality of periodic filters as described above, it becomes possible to move continuously the desired filter characteristic of the variable optical filter 1 in parallel to the optical frequency axis direction, by using Mach-Zehnder interferometer type filters as shown in FIG. 2 as periodic filters to control each of the variable filter characteristics of the periodic filters in accordance with the above-described procedure by the control section 14.

In addition, in the above embodiment, each time when the reference peak Pref of the filter section responsible for realizing the required filter characteristic is located near the boundary of the variable range R, the roles of the first and second filter sections 11 and 12 are switched. However, the present invention is not limited thereto. For example, it is also possible that, during a normal operation, the first filter section 11 is in the transmission state and the second filter section 12 is responsible for realizing the required filter characteristic. That is, when the reference peak Pref in the second filter section 2 is located near the boundary of the variable range R in the optical frequency axis direction, similarly to the control procedure described previously, after the second filter section 12 is in the transmission state and the required filter characteristic is realized by the first filter section 11, the location of the reference peak Pref in the second filter section 12 is moved close to the center of the variable range R. Then, immediately after this, the roles of the first and second filter sections 11 and 12 may be switched again, to realize the required filter characteristic by the second filter section 12.

Furthermore, the first and second filter sections 11 and 12 are directly connected by the optical path 13. However, as shown in a variable filter 1' of FIG. 6 for example, an application in which an optical amplifier 15 is provided between the first and second filter sections 11 and 12 to compensate for insertion loss is also effective. In addition, the optical amplifier 15 is not limited to be placed between the first and second filter sections 11 and 12, and may be placed in the preceding stage of the first filter section 11 or the succeeding stage of the second filter section 12.

Next is a description of a WDM optical transmission system constructed using the variable optical filter 1 as describe above.

Figure 7:
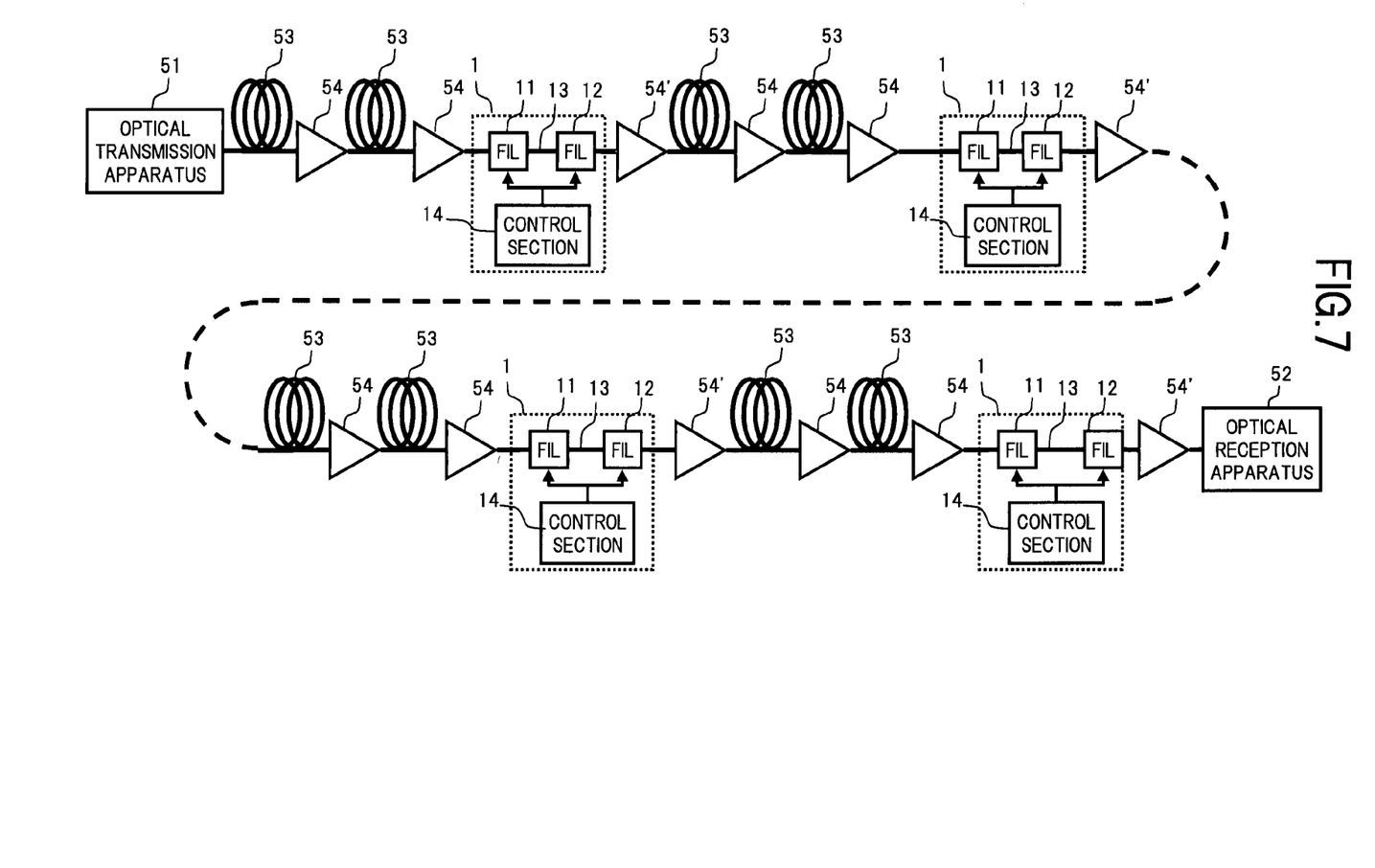
FIG. 7 is a block diagram showing the structure of an optical transmission system according to one embodiment of the present invention.

FIG. 7 is a block diagram showing the structure of an embodiment of the WDM optical transmission system.

Figure 6:
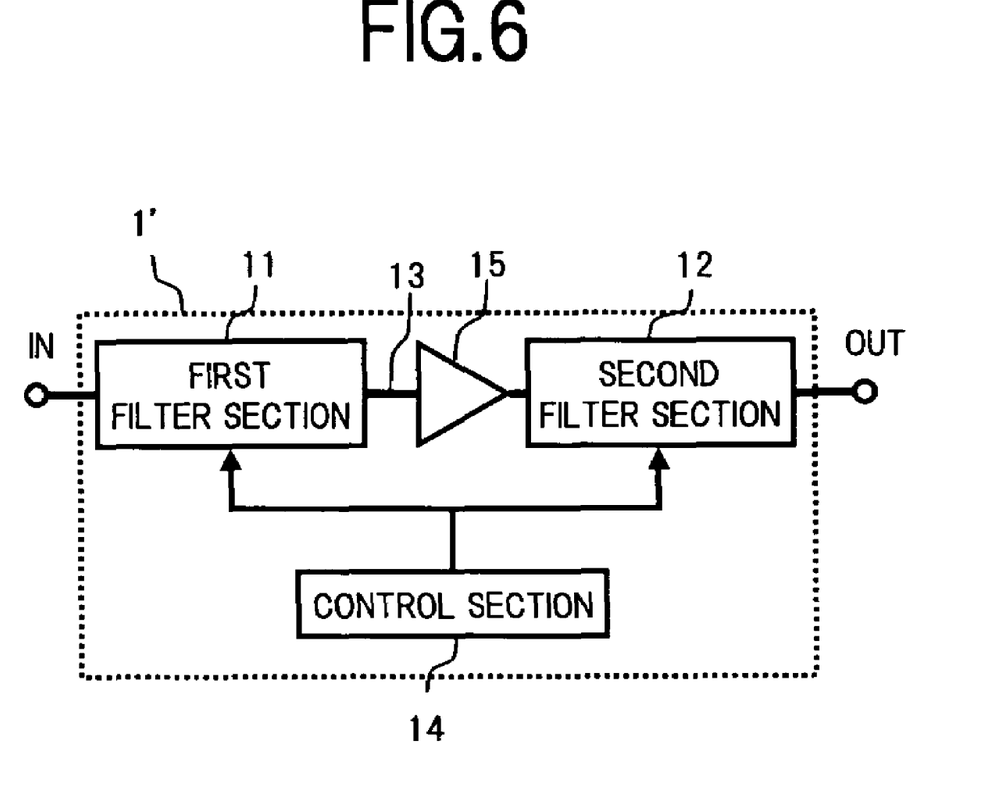
FIG. 6 is a block diagram showing another structural example of the variable optical filter related to the embodiment.

The WDM optical transmission system as shown in FIG. 7 is constructed by arranging gain equalizers each applied with the variable optical filter 1 described above at every required number of repeating intervals (every two repeating intervals in the figure) in a well known system structure, in which an optical transmission apparatus 51 and an optical reception apparatus 52 for transmitting and receiving a WDM signal light respectively, are connected by an optical transmission path 53, and optical amplifiers 54 are arranged at required intervals on the optical transmission path 53, to repeatedly transmit the WDM signal light. An optical amplifiers 54' connected to the output terminal of each of the variable optical filters 1, compensates for the insertion loss of the variable optical filter 1. The optical amplifier 54' may be connected between the first and second filter sections 11 and 12 in the variable optical filter 1 as shown in FIG. 6, or to the input terminal of the variable optical filter 1.

In the WDM optical transmission system as described above, a tilt due to wavelength dependence of the optical transmission path 53, the optical amplifier 54 and the like in each repeating interval is compensated for by the variable optical filter 1 for every two repeating interval. At this time, even if the tilt occurring in the signal light is varied due to various factors such as temperature change, deterioration with time and the like, since the characteristic of the variable optical filter 1 can be controlled continuously over a wide range, following the variation of the tilt, such a situation in which the intensity of the repeatedly transmitted WDM signal light is varied significantly due to the control of the variable optical filter 1 can be avoided. As a result, it becomes possible to repeatedly transmit the WDM signal light between the optical transmission apparatus 51 and the optical reception apparatus 52 in stable.

In the above-described embodiment of the WDM optical transmission system, the gain equalizers each applied with the variable optical filter 1 of the present invention are arranged at every two repeating interval. However, the arrangement may be such that the gain equalizer is arranged corresponding to each repeating interval, or every three or more repeating interval, to perform the tilt compensation.

Figure 8:
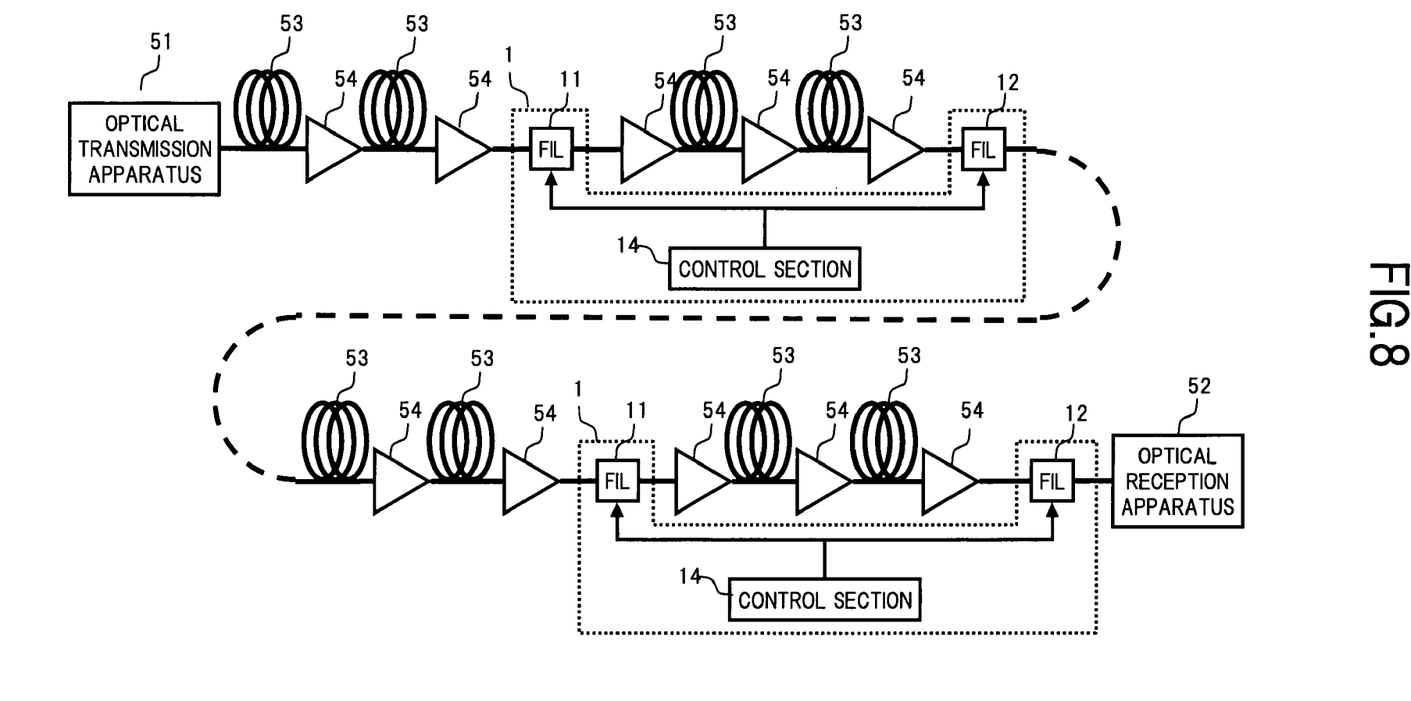
FIG. 8 is a block diagram showing another structural example of the optical transmission system related to the embodiment.

Furthermore, it is also possible, as shown in FIG. 8, that the first and second filter sections 11 and 12 of the variable optical filter 1 are arranged separately in different repeating intervals, and the filter sections 11 and 12 are controlled as described above by the control sections 14. In such a system structure, since the present invention can be applied as paired variable filters arranged as gain equalizers at each compensation node in an existing system, for example, it becomes possible to move continuously the characteristic of the variable optical filter in parallel to the optical frequency axis direction, without increasing the insertion loss or increasing the cost.

What is claimed is:

1. A variable optical filter comprising:
   first and second filter sections connected in series, said first and second filter sections having corresponding first and second filter characteristics respectively with transmissivity of each filter characteristic changing periodically along an optical frequency axis, said first and second filter characteristics each having variable transmissivity and capability of being shifted in an optical frequency axis direction, said first and second filter characteristics being set within a common variable range in the optical frequency axis direction; and
   a control section for, when the filter characteristic of one of said first and second filter sections is required to shift in the optical frequency axis direction to exceed the variable range, relatively controlling the filter characteristics of said first and second filter sections with respect to each other such that a switching is performed from said one of said first and second filter sections to the other of said first and second filter sections, provided that the overall combined filter characteristic of said first and second filter sections becomes constant, to thereby allow the filter characteristic of said other of the first and second filter sections to shift in the optical frequency axis direction instead of the filter characteristic of said one of the first and second filter sections.

2. A variable optical filter according to claim 1,
   wherein, when said first filter section is in a state in which its filter characteristic thereof is flat with respect to the optical frequency axis so that the maximum transmissivity can be obtained, and the overall combined filter characteristic is determined by the filter characteristic of said second filter section, then before the shift of the filter characteristic of said second filter section in the optical frequency axis direction reaches a boundary of said variable range, said control section performs a switching from said second filter section to said first filter section by reducing continuously the amplitude of the transmissivity of the filter characteristic of said first filter section while increasing continuously the amplitude of the transmissivity of the filter characteristic of said second filter section, provided that the overall combined filter characteristic of said first and second filter sections becomes constant.

3. A variable optical filter according to claim 2,
   wherein said control section, when performing the switching from said second filter section to said first filter section, controls a phase of said first filter section so that the shift of the filter characteristic of said first filter section in the optical frequency axis direction becomes a state corresponding to the vicinity of the center of the variable range.

4. A variable optical filter according to claim 1,
   wherein, when said first filter section is in a state in which the said first filter characteristic thereof is flat with respect to optical frequency axis that the maximum transmissivity can be obtained, and said overall combined filter characteristic is determined by said second filter characteristic of said second filter section, then before the shift of said second filter characteristic of said second filter section in the optical frequency axis direction reaches a boundary of said variable range, said control section performs a switching from said second filter section to said first filter section by reducing continuously the amplitude of said transmissivity of said first filter characteristic while increasing continuously the amplitude of the transmissivity of said second filter characteristic, provided that the overall combined filter characteristic of said first and second filter sections becomes constant,
   and said control section successively controls a phase of said second filter section so that the shift of said second filter characteristic of said second filter section in the optical frequency axis direction becomes a state corresponding to a vicinity of the center of the variable range,
   and said control section performs a switching from said first filter section to said second filter section by increasing continuously the amplitude of the transmissivity of said first filter characteristic of said first filter section while reducing continuously the amplitude of the transmissivity of said second characteristic of said second filter section, provided that the overall combined filter characteristic of said first and second filter sections becomes constant.

5. A variable optical filter according to claim 1, further comprising;
   an optical amplification section for compensating for losses occurring in said first and second filter sections.

6. A variable optical filter according to claim 5,
   wherein said optical amplification section is arranged between said first and second filter sections.

7. A variable optical filter according to claim 1,
wherein said first and second filter sections each comprises a plurality of period filters with mutually different periods connected in series.

8. A variable optical filter according to claim 1,
wherein said first and second filter sections each includes a Mach-Zehnder interferometer filter.

9. An optical transmission system for collectively amplifying a wavelength division multiplexed signal light using an optical amplifier arranged on an optical transmission path, and compensating for a tilt occurring in the wavelength division multiplexed signal light using at least one gain equalizer to repeatedly transmit the wavelength division multiplexed signal light,
wherein said gain equalizer includes a variable optical filter recited in claim 1.

10. An optical transmission system according to claim 9,
wherein in said variable optical filter, said first and second filter sections are arranged in different repeating intervals.

11. A method of controlling a variable optical filter with a filter characteristic having its transmissivity changed periodically along an optical frequency axis, wherein first and second filter sections are connected in series, said first and second filter sections having first and second filter characteristics respectively with transmissivity that is changed periodically along an optical frequency axis, said first and second filter characteristics having variable transmissivity and capability of being shifted in an optical frequency axis direction, said first and second filter characteristics capable of being set within a common variable range in the optical frequency axis direction, the method comprising:
when the filter characteristic of one of said first and second filter sections is required to shift in the optical frequency axis direction to exceed said variable range, said first and second filter characteristics of said first and second filter sections respectively are relatively controlled such that a switching is performed from said one of said first and second filter sections to the other of said first and second filter sections, provided that the overall combined filter characteristic of said first and second filter sections becomes constant, to thereby allow the filter characteristic of said other of the first and second filter sections to shift in the optical frequency axis direction instead of the filter characteristic of said one of the first and second filter sections.

12. A method of controlling a variable optical filter according to claim 11,
wherein when said first filter section is in a state in which its filter characteristic thereof is flat with respect to the optical frequency axis so that the maximum transmissivity can be obtained, and the overall filter characteristic is determined by the filter characteristic of said second filter section, then before the shift of the filter characteristic of said second filter section in the optical frequency axis direction reaches a boundary of the variable range, a switching from said second filter section to said first filter section is performed by reducing continuously the amplitude of the transmissivity of the filter characteristic of said first filter section while increasing continuously the amplitude of the transmissivity of the filter characteristic of said second filter section, provided that the overall combined filter characteristic of said first and second filter sections becomes constant.

* * * * *

UNITED STATES PATENT AND TRADEMARK OFFICE
CERTIFICATE OF CORRECTION

| | | |
|---|---|---|
| PATENT NO. | : 6,978,064 B2 | Page 1 of 1 |
| APPLICATION NO. | : 10/705220 | |
| DATED | : December 20, 2005 | |
| INVENTOR(S) | : Setsuo Yoshida et al. | |

It is certified that error appears in the above-identified patent and that said Letters Patent is hereby corrected as shown below:

column 10, line 30, after "axis" insert --so-- column 11, line 2, delete "comprises" and insert --comprise-- column 12, line 15, after "wherein" insert --,--

Signed and Sealed this

Fifteenth Day of August, 2006

JON W. DUDAS
*Director of the United States Patent and Trademark Office*